United States Patent
Inoue (10) Patent No.: US 11,548,988 B2
(45) Date of Patent: Jan. 10, 2023

(54) MASTERBATCH, RESIN MOLDING MATERIAL, MOLDED BODY, METHODS FOR MANUFACTURING THE MASTERBATCH, THE RESIN MOLDING MATERIAL, AND THE MOLDED BODY, AND METHOD FOR EVALUATING MASTERBATCH

(71) Applicant: TOKYO PRINTING INK MFG. CO., LTD., Tokyo (JP)

(72) Inventor: Atsushi Inoue, Saitama (JP)

(73) Assignee: TOKYO PRINTING INK MFG. CO., LTD., Tokyo (JP)

( * ) Notice: Subject to any disclaimer, the term of this patent is extended or adjusted under 35 U.S.C. 154(b) by 91 days.

(21) Appl. No.: 16/072,310

(22) PCT Filed: Dec. 20, 2016

(86) PCT No.: PCT/JP2016/087922
§ 371 (c)(1),
(2) Date: Jul. 24, 2018

(87) PCT Pub. No.: WO2017/130608
PCT Pub. Date: Aug. 3, 2017

(65) Prior Publication Data
US 2019/0023858 A1    Jan. 24, 2019

(30) Foreign Application Priority Data
Jan. 27, 2016 (JP) .............................. JP2016-013389

(51) Int. Cl.
*C08J 3/22* (2006.01)
*C08K 3/04* (2006.01)
(Continued)

(52) U.S. Cl.
CPC ................. *C08J 3/22* (2013.01); *B29C 45/00* (2013.01); *B29C 45/26* (2013.01); *C08J 3/226* (2013.01);
(Continued)

(58) Field of Classification Search
CPC .......... C08J 3/22; C08J 3/226; C08J 2323/12; B29C 45/00; B29C 45/0001; B29C 45/37;
(Continued)

(56) References Cited

U.S. PATENT DOCUMENTS 6,316,547 B1    11/2001    Varlet
7,195,728 B2    3/2007    Katsumura et al.
(Continued)

FOREIGN PATENT DOCUMENTS

CN    1278280 A    12/2000
CN    1856522 A    11/2006
(Continued)

OTHER PUBLICATIONS

Tao et al., machine English translation of JP 2013-209494 (Year: 2013).*

(Continued)

*Primary Examiner* — Jessica M Roswell
(74) *Attorney, Agent, or Firm* — Rankin, Hill & Clark LLP (57) ABSTRACT

The masterbatch contains a black pigment and a masterbatch thermoplastic resin, the masterbatch satisfying the following conditions:
(Conditions)
when a resin plate is produced by kneading 100 parts by weight of polypropylene having a melt flow rate of 30 g/10 min (JIS K7210:1999) and a density of 0.9 g/cm$^3$ (JIS K7112:1999) with respect to 3 parts by weight of the masterbatch and subjecting the mixture to injection (Continued)

molding using a mold polished by a coated abrasive with a particle size of #800 (JIS R6001:1998), a* values and b* values of a surface of the resin plate in the L*a*b* color system satisfy specific conditions.

10 Claims, 2 Drawing Sheets

(51) Int. Cl.

| | |
|---|---|
| C08L 23/06 | (2006.01) |
| B29C 45/00 | (2006.01) |
| C08L 67/00 | (2006.01) |
| C08L 69/00 | (2006.01) |
| C08L 77/00 | (2006.01) |
| C08L 101/00 | (2006.01) |
| C08L 33/12 | (2006.01) |
| B29C 45/26 | (2006.01) |
| C08K 5/23 | (2006.01) |
| C08K 5/3437 | (2006.01) |
| C08L 23/12 | (2006.01) |
| C08L 67/02 | (2006.01) |
| B29C 45/37 | (2006.01) |
| C08K 3/013 | (2018.01) |
| B29K 105/00 | (2006.01) |

(52) U.S. Cl.
CPC .................. *C08K 3/04* (2013.01); *C08K 5/23* (2013.01); *C08K 5/3437* (2013.01); *C08L 23/06* (2013.01); *C08L 23/12* (2013.01); *C08L 33/12* (2013.01); *C08L 67/00* (2013.01); *C08L 67/02* (2013.01); *C08L 69/00* (2013.01); *C08L 77/00* (2013.01); *C08L 101/00* (2013.01); *B29C 45/0001* (2013.01); *B29C 45/37* (2013.01); *B29K 2105/0032* (2013.01); *B29K 2995/002* (2013.01); *C08J 2323/06* (2013.01); *C08J 2323/12* (2013.01); *C08J 2423/04* (2013.01); *C08J 2423/12* (2013.01); *C08K 3/013* (2018.01); *C08K 2201/005* (2013.01); *C08K 2201/006* (2013.01); *C08L 2310/00* (2013.01)

(58) Field of Classification Search
CPC ........ C08L 77/00; C08L 101/00; C08L 67/00; C08L 69/00; C08L 27/02
See application file for complete search history.

(56) References Cited

U.S. PATENT DOCUMENTS

| | | | |
|---|---|---|---|
| 7,923,501 | B2 | 4/2011 | Shimouse et al. |
| 8,158,706 | B2 | 4/2012 | Shimouse et al. |
| 8,357,741 | B2 | 1/2013 | Meyer |
| 9,262,705 | B2 | 2/2016 | Nakatani |
| 2003/0078346 | A1 | 4/2003 | Nakamura |
| 2003/0203993 | A1 | 10/2003 | Katsumura et al. |
| 2005/0222318 | A1 | 10/2005 | Chauvin |
| 2005/0226835 | A1 | 10/2005 | Nakamura |
| 2007/0037940 | A1 | 2/2007 | Lazzari et al. |
| 2007/0194479 | A1 | 8/2007 | Sato et al. |
| 2008/0161474 | A1 | 7/2008 | Shimouse et al. |
| 2008/0191176 | A1* | 8/2008 | Tobori ..................... C08J 3/226 252/511 |
| 2011/0127696 | A1 | 6/2011 | Shimouse et al. |
| 2011/0292502 | A1 | 12/2011 | Meyer |
| 2012/0108725 | A1* | 5/2012 | Pierre .................... C08L 23/06 524/495 |
| 2012/0118390 | A1* | 5/2012 | Piel ........................ B29C 48/09 137/1 |
| 2013/0301065 | A1 | 11/2013 | Nakatani |
| 2014/0087211 | A1* | 3/2014 | Omura ................... G11B 5/733 428/832.4 |
| 2014/0295160 | A1 | 10/2014 | Meyer |
| 2018/0127556 | A1* | 5/2018 | Liu ....................... C08L 101/00 |

FOREIGN PATENT DOCUMENTS

| | | |
|---|---|---|
| CN | 101225201 A | 7/2008 |
| CN | 101397371 A | 4/2009 |
| CN | 101927626 A | 12/2010 |
| CN | 102516637 A | 6/2012 |
| CN | 102634101 A | 8/2012 |
| EP | 1067144 A1 | 1/2001 |
| JP | H05194825 A | 8/1993 |
| JP | H09095592 A | 4/1997 |
| JP | 2000-1597 A † | 1/2000 |
| JP | 2004-1448 A | 1/2004 |
| JP | 2007333726 A | 12/2007 |
| JP | 2009-197211 A † | 9/2009 |
| JP | 2011-144271 A † | 7/2011 |
| JP | 2011144271 A | 7/2011 |
| JP | 2013526624 A | 6/2013 |
| JP | 2013-209494 A † | 10/2013 |
| JP | 2013-221131 A † | 10/2013 |
| JP | 2013209494 A | 10/2013 |
| JP | 2013252698 A | 12/2013 |
| JP | 2015505745 A | 2/2015 |
| JP | 2016210984 A | 12/2016 |

OTHER PUBLICATIONS

Extended European Search Report dated Jul. 25, 2019 for EP Patent Application No. 16888192.8.
International Search Report dated Mar. 7, 2017 filed in PCT/JP2016/087922.
Chinese Office Action (CNOA) dated Jan. 28, 2021 issued in the corresponding Chinese patent application No. 201680080221.1.
Yuan-Tao Ning et al., "Precious Metal Jewelry Materials", Metallurgical Industry Press, 2013, p. 42, total 3 pages; Cited in CNOA.
Ma Jian et al., "Summer Palace: Research on the lighting technology of classical gardens", Tianjin University Press, 2009, p. 104, total 3 pages; Cited in CNOA.
Zeng De et al., "Stabilizer", National Defense Industry Press, 2011, pp. 386-387, total 4 pages; Cited in CNOA.
Chinese Office Action (CNOA) dated Jun. 3, 2020 issued in the corresponding Chinese Patent Application No. 201680080221.1.
Kao, "Practical Techniques of Filling Modification for Plastics", China Light Industry Press, Oct. 2012, total 5 pages; Cited in CNOA.
"Uniform color space and color difference formula", Standards Press of China, 2008, GB T 7921-2008, total 11 pages; Cited in CNOA.
Product specification of Mitsubishi Carbon black, published online by Mitsubishi Chemical Corporation, Webpage <http://www.carbonblack.jp/en/product/list2_01.html>, 2 pages, Jul. 18, 2007, retrieved from Internet Archive Wayback Machine <https://web.archive.org/web/20070718145750/http://www.carbonblack.jp/en/product/list2_01.html> on Mar. 11, 2019.†
Note : This D8 is shown at the same URL as that of D7, after update on Nov. 4, 2017. Product specification of Mirror-like Finishing, published online by NAGAMINE Metal Industry Limited Company, Webpage <http://www.nagaminekinnzoku.com/category/1313580.html>, 1 page, Nov. 4, 2017, retrieved from Internet Archive Wayback Machine <https://web.archive.org/web/20171104103418/http://www.nagaminekinnzoku.com/category/1313580.html> on Mar. 14, 2019.†
Product specification of Mirror-like Finishing, published online by NAGAMINE Metal Industry Limited Company, Webpage <http://

(56) References Cited

OTHER PUBLICATIONS www.nagaminekinnzoku.com/category/1313580.html>, 1 page, Apr. 20, 2013, retrieved from Internet Archive Wayback Machine <https://web.archive.org/web/20130420023304/http://www.nagaminekinnzoku.com/category/1313580.html> on Mar. 11, 2019.†

\* cited by examiner
† cited by third party

MASTERBATCH, RESIN MOLDING MATERIAL, MOLDED BODY, METHODS FOR MANUFACTURING THE MASTERBATCH, THE RESIN MOLDING MATERIAL, AND THE MOLDED BODY, AND METHOD FOR EVALUATING MASTERBATCH

TECHNICAL FIELD

The present invention relates to a masterbatch, a resin molding material, a molded body, methods for manufacturing the masterbatch, the resin molding material, and the molded body, and a method for evaluating the masterbatch.

BACKGROUND ART

Conventional methods for obtaining a colored resin molded body include mixing a masterbatch containing a resin dispersed with pigments in advance and a resin as a material of the resin molded body to be colored, and thereafter molding the mixture. Such a masterbatch is manufactured by kneading pigments used for coloring and a resin which is the same as or different from the resin as a material of the resin molded body, together with various additives which are added as necessary.

For example, Patent Document 1 discloses a resin composition using a polyolefin resin, carbon nanotubes, and a specific wax. More specifically, Patent Document 1 discloses obtaining a jet-black tone having a bluish tint and a high degree of blackness by dispersing carbon nanotubes coated with a specific wax into a polyolefin resin.

Meanwhile, conventional resin molded bodies applied with three-dimensional processing sometimes have an impression deteriorated in quality of the outer appearance, thus lacking a sense of uniformity in color, due to an occurrence of a phenomenon of differences in tint, impression, aesthetic sense, and the like felt by a user due to changes in light reflection depending on the angle of view of the user. Bronzing is known as a cause of such a phenomenon.

As a method for evaluating bronzing, for example, Patent Document 2 discloses using a multi-angle spectrocolorimeter to obtain reflection intensity ratios at a baseline of 550 nm and a peak top of 650 nm at a light receiving angle with the highest reflectance in a red wavelength region, whereby, the lower the reflection intensity ratio, the more reduced the bronzing.

Further, Patent Document 3 discloses using a three-dimensional deflection angle spectrophotometric system to calculate chroma of a regular reflection light by irradiating a recorded image with light from a 45° direction and receiving the light at a position of 45° in the opposite direction, whereby bronzing is less conspicuous as the chroma of the regular reflection light is smaller. In addition, Patent Document 3 sets the chroma of the bronze color to $C^*=\sqrt{(a^{*^\wedge}2+b^{*^\wedge}2)}$.

RELATED DOCUMENT

Patent Document

[Patent Document 1] Japanese Unexamined Patent Application Publication No. 2013-209494
[Patent Document 2] Japanese Unexamined Patent Application Publication No. 2011-144271
[Patent Document 3] Japanese Unexamined Patent Application Publication No. 2013-252698

SUMMARY OF THE INVENTION

Technical Problem

In recent years, a sense of uniformity in color at a higher level has been in demand in response to enhancements in the users' aesthetic sense. Particularly, in a black resin molded body applied with three-dimensional processing, the reflection of light that is changed due to unevenness of the resin molded body, in addition to the different viewing angles of the user, may cause variations in tint, impression, aesthetic sense, and the like that is felt by the user. Thus, a more uniform jet-black tone is being demanded.

For this reason, a uniform jet-black color at the higher level demanded by users could not be achieved by simply suppressing bronzing.

Solution to Problem

As a result of intensive studies, the present inventor has obtained a finding that satisfying specific conditions in a masterbatch is effective as a design guideline for solving the above-described problem.

That is, the present inventor has focused on the fact that the cause for the differences in tint, impression, aesthetic sense, and the like felt by a user may be found in variations of $a^*$ values and $b^*$ values of the received light in the $L^*a^*b^*$ color system, due to change in the position of a light source when irradiating a fixed resin molded body with light. The present inventor has found for the first time that, by establishing a new design guideline for fluctuations of the $a^*$ values and the $b^*$ values under specific conditions, and by allowing the $a^*$ values and the $b^*$ values to satisfy certain conditions, it is possible to obtain a uniform jet black color at a high level as a result of a user hardly feeling variations in tint, impression, aesthetic sense, and the like, even through observation of the resin molded body from any angle. The inventor has thus completed the present invention.

The present invention provides a masterbatch containing a black pigment and a masterbatch thermoplastic resin the masterbatch satisfying the following conditions:

(Conditions)

when a resin plate is produced by kneading 100 parts by weight of polypropylene having a melt flow rate of 30 g/10 min (JIS K7210:1999) and a density of 0.9 g/cm³ (JIS K7112:1999) with respect to 3 parts by weight of the masterbatch and subjecting the mixture to injection molding using a mold polished by a coated abrasive with a particle size of #800 (JIS R6001:1998), $a^*$ values and $b^*$ values of a surface of the resin plate in the $L^*a^*b^*$ color system satisfy Expressions (1) to (4):

$$D=[(a^* \text{ value}_{20}-a^* \text{ value}_{45})^2+(b^* \text{ value}_{20}-b^* \text{ value}_{45})^2]^{1/2}+[(a^* \text{ value}_{45}-a^* \text{ value}_{75})^2+(b^* \text{ value}_{45}-b^* \text{ value}_{75})^2]^{1/2}+[(a^* \text{ value}_{75}-a^* \text{ value}_{110})^2+(b^* \text{ value}_{75}-b^* \text{ value}_{110})^2]^{1/2} \quad (1)$$

$$D<4.3 \quad (2)$$

$$\Delta a^*<2.5 \quad (3)$$

$$\Delta b^*<3.6 \quad (4)$$

(wherein in the Expressions, $a^*$ value$_{20}$, $a^*$ value$_{45}$, $a^*$ value$_{75}$, $a^*$ value$_{110}$, $b^*$ value$_{20}$, $b^*$ value$_{45}$, $b^*$ value$_{75}$, and $b^*$ value$_{110}$ represent respective $a^*$ values and $b^*$ values when a perpendicular line is set to 45°, a light receiving unit is set to 90°, and light sources are set to 20°, 45°, 75°, and 110° using a multidirectional illuminating and unidirectional light receiving multi-angle colorimeter $\Delta a^*$=(maximum value among $a^*$ value$_{20}$, $a^*$ value$_{45}$, $a^*$ value$_{75}$, and $a^*$ value$_{110}$)−(minimum value among $a^*$ value$_{20}$, $a^*$ value$_{45}$, $a^*$ value$_{75}$, and $a^*$ value$_{110}$)

$\Delta b^*$=(maximum value among $b^*$ value$_{20}$, $b^*$ value$_{45}$, $b^*$ value$_{75}$, and $b^*$ value$_{110}$)−(minimum value among $b^*$ value$_{20}$, $b^*$ value$_{45}$, $b^*$ value$_{75}$, and $b^*$ value$_{110}$)).

Advantageous Effects of the Invention

The present invention provides a masterbatch capable of achieving a uniform jet-black color at a high level, a molding material, and a molded body.

BRIEF DESCRIPTION OF THE DRAWINGS

The above-described object, other objects, characteristics, and advantages will become more apparent from a preferred embodiment described below, and accompanying drawings below.

DESCRIPTION OF EMBODIMENT

Hereinafter, an embodiment of the present invention will be described with reference to the drawings. "JIS" is an industrial standard established by the competent minister in response to a report of the Japanese Industrial Standards Committee based on the Industrial Standardization Law and is one of the national standards of Japan. In addition, "#800" indicates a predetermined particle distribution of fine powder.

Figure 1:
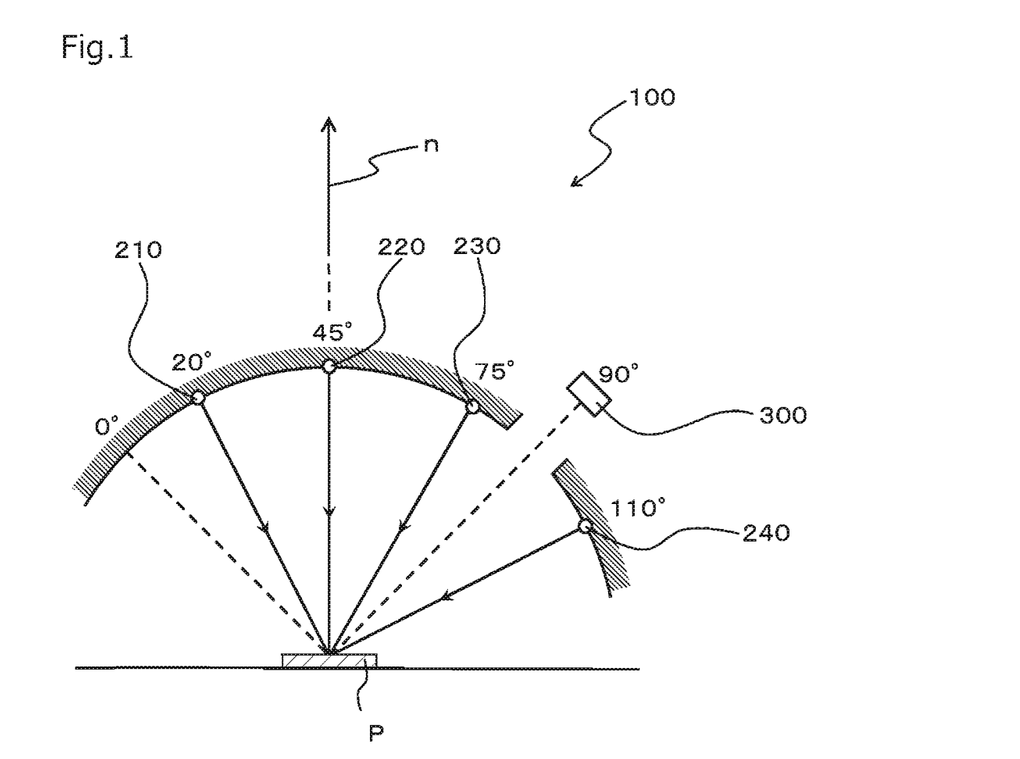
FIG. 1 is a diagram schematically showing a multi-angle colorimeter according to the present embodiment.
Figure 2:
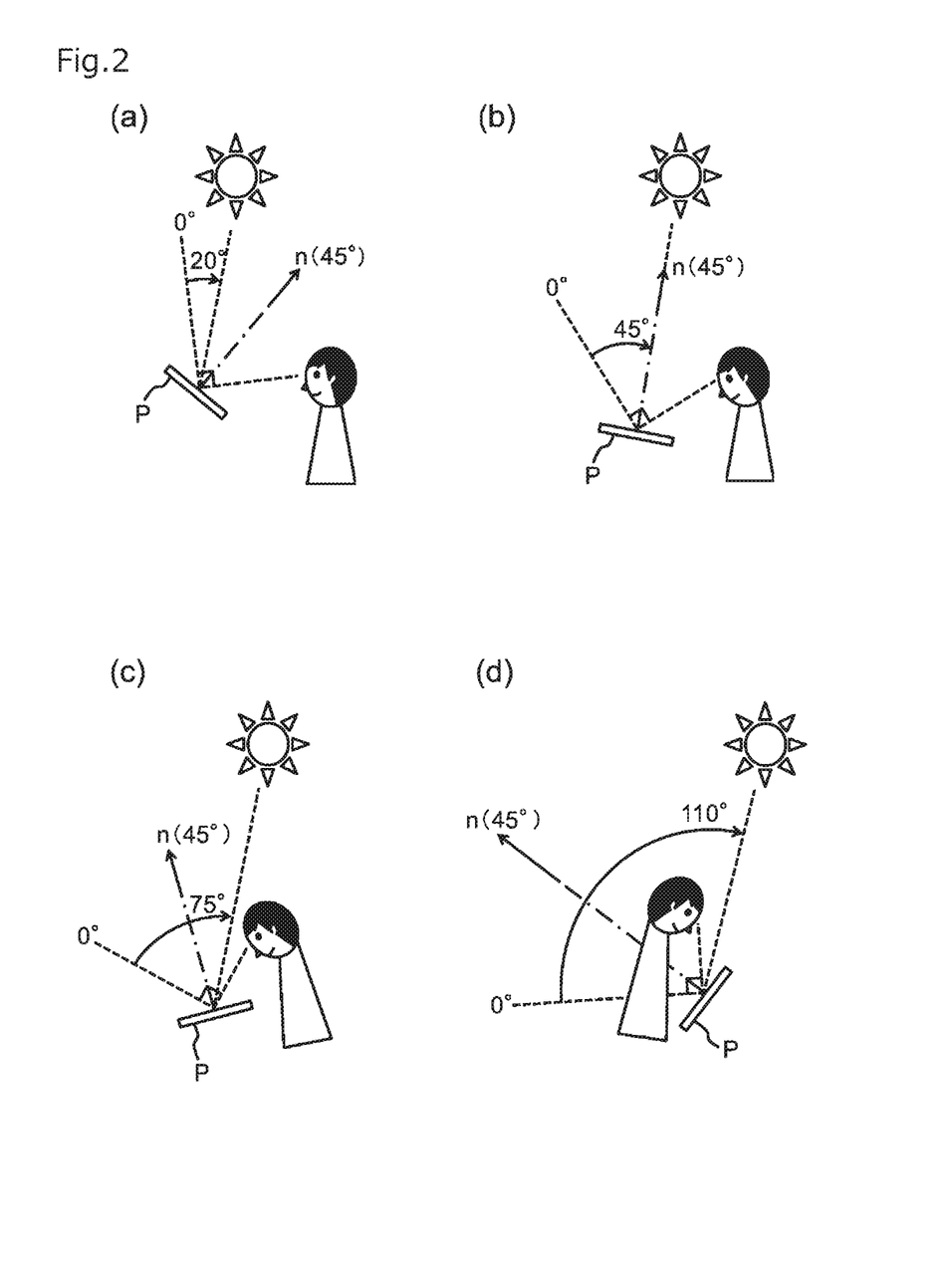
FIG. 2 is a schematic diagram for describing an evaluation method in Examples.

FIG. 1 is a view schematically showing a multidirectional illuminating and unidirectional light receiving multi-angle colorimeter according to the present embodiment. As shown in FIG. 1, the multi-angle colorimeter 100 includes light sources 210, 220, 230, and 240, and a light receiving unit 300 and adopts a multidirectional illuminating and unidirectional light receiving system for irradiating an object with light beams from four different directions and receiving the light beams in one direction. The light sources 210, 220, 230, and 240 are positioned at 20°, 45°, 75°, and 110°, respectively, when a normal line n (perpendicular line) is set to 45° and the light receiving unit is set to 90°.

The light beams sequentially emitted from each of the light sources 210, 220, 230, and 240 toward a resin plate P are reflected by the surface of the resin plate P. Light parallel to an angle of 45° with respect to the normal line among the reflected light beams is received by the light receiving unit 300 and a color in the L*a*b* color system is determined (the position of the light receiving unit 300 becomes 90° in a case where the normal line is set to 45°).

For example, "CE-741GL" (manufactured by Macbeth) can be used as the multidirectional illuminating and unidirectional light receiving multi-angle colorimeter.

Resin Plate

A resin plate is produced by kneading 100 parts by weight of polypropylene having a melt flow rate of 30 g/10 min (JIS K7210:1999) and a density of 0.9 g/cm³ (JIS K7112:1999) with respect to 3 parts by weight of the masterbatch and subjecting the mixture to injection molding using a mold polished by a coated abrasive with a particle size of #800 (JIS R6001:1998).

The resin plate has a flat surface, and preferably has a thickness of 2 to 3 mm.

The $a^*$ values and the $b^*$ values in the L*a*b* color system of the surface of the resin plate satisfy Expressions (1) to (4).

$$D=[(a^* \text{value}_{20}-a^* \text{value}_{45})^2+(b^* \text{value}_{20}-b^* \text{value}_{45})^2]^{1/2}+[(a^* \text{value}_{45}-a^* \text{value}_{75})^2+(b^* \text{value}_{45}-b^* \text{value}_{75})^2]^{1/2}+[(a^* \text{value}_{75}-a^* \text{value}_{110})^2+(b^* \text{value}_{75}-b^* \text{value}_{110})^2]^{1/2} \quad (1)$$

$$D<4.3 \quad (2)$$

$$\Delta a^*<2.5 \quad (3)$$

$$\Delta b^*<3.6 \quad (4)$$

(In the Expressions, $a^*$ value$_{20}$, $a^*$ value$_{45}$, $a^*$ value$_{75}$, $a^*$ value$_{110}$, $b^*$ value$_{20}$, $b^*$ value$_{45}$, $b^*$ value$_{75}$, and $b^*$ value$_{110}$ represent respective $a^*$ values and $b^*$ values when a perpendicular line is set to 45°, a light receiving unit is set to 90°, and light sources are set to 20°, 45°, 75°, and 110° using a multidirectional illuminating and unidirectional light receiving multi-angle colorimeter.

$\Delta a^*$=(maximum value among $a^*$ value$_{20}$, $a^*$ value$_{45}$, $a^*$ value$_{75}$, and $a^*$ value$_{110}$)−(minimum value among $a^*$ value$_{20}$, $a^*$ value$_{45}$, $a^*$ value$_{75}$, and $a^*$ value$_{110}$)

$\Delta b^*$=(maximum value among $b^*$ value$_{20}$, $b^*$ value$_{45}$, $b^*$ value$_{75}$, and $b^*$ value$_{110}$)−(minimum value among $b^*$ value$_{20}$, $b^*$ value$_{45}$, $b^*$ value$_{75}$, and $b^*$ value$_{110}$))

Here, in conventional methods for evaluating bronzing as disclosed in Patent Documents 2 and 3, evaluation is made on light which is received when light is emitted from one direction. Therefore, the methods were not sufficiently adequate to evaluate a three-dimensional resin molded body. In addition, the technique disclosed in Patent Document 2 focuses on the reflectance of a red wavelength, evaluating bronzing as being further reduced as the reflection intensity ratio is smaller. That is, the technique evaluates only the redness with respect to light in one direction, and therefore, a uniform jet black color at a high level could not be obtained.

On the other hand, the conditions satisfied by the masterbatch in the present embodiment reproduces a state of a resin molded body actually being used by a user, by changing the positions of the light source in multiple stages. In addition, the conditions satisfied by the masterbatch in the present embodiment focuses on the variable distances of the $a^*$ values and the $b^*$ values caused by the difference in the positions of light source. Therefore, it is possible to further reduce the differences in tint, impression, aesthetic sense, and the like of the molded body and to obtain a uniform jet black color at a high level compared to simply focusing on the $\Delta a^*$ value and the $\Delta b^*$ value.

In the Expressions, D is a sum total obtained when variations of $a^*$ values and $b^*$ values caused by differences in the positions of the light source are calculated as distances. That is, a molded body having a uniform jet black color is obtained even when the light source and the user is in any direction, for example, even when the user's position for observing the resin molded body is changed or even when the positions of the light source is changed.

D is less than 4.3, more preferably less than 2.5, and still more preferably less than 1.8 from the viewpoint of obtaining a more uniform jet black color.

The difference Δa* between the maximum value and the minimum value of the above-described a* values is less than 2.5, preferably less than or equal to 2.3, and more preferably less than or equal to 1.9. Accordingly, a more uniform jet black color is obtained.

The above-described a* values are preferably within a range of −15 to 15.

The difference Δb* between the maximum value and the minimum value of the above-described b* values is less than 3.6, preferably less than or equal to 3.4, and more preferably less than or equal to 2.2. Accordingly, a more uniform jet black color is obtained.

The above-described b* values are preferably within a range of −15 to 15.

The L* value of the resin plate is preferably less than or equal to 35. Accordingly, a deep black color is obtained. The L* value of the resin plate is measured using an integrating sphere spectrophotometer.

The surface of the mold polished with a coated abrasive with a particle size of #800 (JIS R 6001:1998) is transferred onto the surface of the resin plate. A well-known method may be used as the method for polishing the mold.

The present inventor has devised a manufacturing method different from conventional methods so that a* values and b* values of the surface of the resin plate satisfy Expressions (1) to (4). Specifically, it is important to properly combine and adjust the following conditions.

(i) Combination of black pigments and masterbatch thermoplastic resin
(ii) Selection of black pigments
(iii) Method for manufacturing masterbatch
(iv) Combination of black pigments and other pigments
Masterbatch
(Black Pigment)

The black pigment may be any inorganic pigment or organic pigment, examples thereof including inorganic pigments such as carbon black, black iron oxide (triiron tetraoxide), black titanium oxide, copper manganese black, copper chromium black, and cobalt black, and organic pigments such as cyanine black and aniline black. A black pigment may be used alone or in combination of two or more kinds thereof.

Among the black pigments, carbon black is preferable from the viewpoint of obtaining a uniform jet black color. Examples of carbon black include channel black, oil furnace black, gas furnace black, thermal black, acetylene black, and bone black.

The content of carbon black, with respect to the entire content of black pigments, is preferably greater than or equal to 50 mass %, more preferably greater than or equal to 80 mass %, and still more preferably greater than or equal to 95 mass % from the viewpoint of obtaining a uniform jet black color. The content of carbon black may be 100 mass % with respect to the entire content of the black pigments.

The black pigments are preferably in the form of particles.

The average primary particle diameter of the black pigments is preferably greater than or equal to 5 nm and more preferably 10 nm from the viewpoint of obtaining a uniform jet black color, and is preferably less than or equal to 5 μm and more preferably less than or equal to 1 μm in view of reducing the brightness and obtaining superior dispersibility.

In addition, from the same view, the average primary particle diameter of carbon black is preferably greater than or equal to 5 nm and more preferably greater than or equal to 12 nm. Moreover, the average primary particle diameter of carbon black is preferably less than or equal to 1 μm, more preferably less than or equal to 500 nm, and still more preferably less than or equal to 100 nm.

The average primary particle diameter of the black pigments is obtained through observation using a transmission electron microscope (TEM) to obtain a primary particle image of the pigments, measuring the particle diameter of each of about 200 to 300 pigment particles, and calculating an average value.

In addition, the specific surface area of the carbon black is preferably greater than or equal to 10 $m^2/g$, more preferably greater than or equal to 20 $m^2/g$, and still more preferably greater than or equal to 100 $m^2/g$ from the viewpoint of obtaining a uniform jet black color. Moreover, the specific surface area of the carbon black is preferably less than or equal to 400 $m^2/g$ and more preferably less than or equal to 300 $m^2/g$, in view of suppressing aggregation of the black pigments to obtain a uniform black color.

The specific surface area of carbon black can be measured according to JIS K6217-2.

The surface of the black pigments may be physically or chemically treated. Accordingly, superior dispersibility is obtained.

(Masterbatch Thermoplastic Resin)

The masterbatch thermoplastic resin (base resin) is used for forming the masterbatch in pellets. Examples of the masterbatch thermoplastic resin include a polyolefin resin such as a polyethylene resin and a polypropylene resin, a polystyrene resin, an acrylonitrile-butadiene-styrene (ABS) resin, a polycarbonate resin, a polyamide resin, a polyester resin, a polybutylene terephthalate resin, and a polymethyl methacrylate resin (PMMA). These may be used alone, or two or more kinds thereof may be mixed.

From the viewpoint of effectively obtaining a uniform jet black color, a polyolefin resin is preferable, and a polyethylene resin and a polypropylene resin are more preferable.

(Other Components)

Various additives such as pigments other than the black pigments, ester wax, polyethylene wax, various stabilizers such as antioxidants, ultraviolet absorbers, and antistatic agents, flame retardants, and surfactants may be added to the masterbatch within the scope not impairing the effect of the present invention.

The pigments other than the black pigments may be either inorganic pigments or organic pigments. For example, the masterbatch may contain organic pigments including phthalocyanine pigments such as phthalocyanine blue and phthalocyanine green, azo pigments such as azo yellow lake, azo lake red, and monoazo yellow, and polycyclic pigments such as quinacridone pigments, perylene pigments, quinophthalone pigments, and anthraquinone pigments; or inorganic pigments such as ultramarine blue, cobalt, red iron oxide, titanium oxide, nickel titanium yellow, and chromium titanium yellow. One or more kinds of these pigments can be used.

A uniform jet black color can be obtained by appropriately combining these pigments according to the primary average particle diameter, the specific surface area, a* values, b* values, L* values, and the like of the black pigments.

Among the pigments, it is preferable to use a phthalocyanine pigment. In addition, in a case where two or more kinds of pigments are used, a complementary color relation should preferably be achieved. For example, in a case where a red organic pigment is used, a sense of uniformity can be obtained by combining a green organic pigment therewith.

The content of the black pigments is preferably 10 to 100 mass %, more preferably 10 to 90 mass %, and still more preferably 30 to 90 mass %, based on the entire content of the pigments, from the viewpoint of effectively obtaining a uniform jet black color.

The entire content of the pigments is preferably greater than or equal to 15 parts by weight, more preferably greater than or equal to 30 parts by weight, and more preferably greater than or equal to 50 parts by weight with respect to 100 parts by weight of the masterbatch thermoplastic resin. Accordingly, a uniform jet black color can be obtained. Moreover, the entire content of the pigments is preferably less than or equal to 100 parts by weight and more preferably less than or equal to 80 parts by weight with respect to 100 parts by weight of masterbatch thermoplastic resin. Accordingly, the pigments can be favorably kneaded with respect to the masterbatch thermoplastic resin.

Ester wax is used to facilitate uniform blending of pigments. Ester wax having a softening temperature of lower than or equal to about 100° C. is preferable. For example, montanic acid wax, hydrogenated castor oil, and the like which are solids at room temperature are preferable, and an ester of montanic acid and one or more kinds of aliphatic dihydric alcohols such as ethylene glycol, 1,4-butanediol, and 1,6-hexanediol is more preferable. Examples of commercially available products include a Hoechst's product "HOECHST WAX E" and a BASF SE's product "E WAX BASF".

In addition, polyethylene wax is used to facilitate uniform blending of pigments. Polyethylene wax having a softening point of lower than or equal to 115° C. is preferable. Examples thereof include those obtained by polymerizing ethylene at a high temperature and a high pressure, those obtained by separating and purifying low molecular weight components of a polyethylene polymer, those obtained by thermally decomposing polyethylene, or the like. Those obtained by polymerizing ethylene at a high temperature and a high pressure is preferable from the viewpoint of improving dispersibility of pigments. In addition, the obtained polymer may be oxidized or acid-modified. Examples of commercially available products include "Hi-wax" manufactured by Mitsui Chemicals, Inc. and "A-C" manufactured by Honeywell International Inc.

Method for Manufacturing Masterbatch

The masterbatch in the present embodiment is manufactured as follows.

First, a black pigment, a masterbatch thermoplastic resin, and other additives as necessary are kneaded using a standard kneading machine, for example, a banbury mixer, a kneader, or a twin-screw extruder. The black pigment is kneaded into the masterbatch resin at high concentration. At this time, it is possible to control the above-described specific conditions by setting the molding temperature, time, and the rotation speed of an extruder in accordance with the primary average particle diameter, the specific surface area, the blending amount in the masterbatch thermoplastic resin, and the like of the black pigment. Preferably, the molding temperature may be set to 50° C. to 200° C. and the rotation speed of the extruder may be set to 200 to 300 rpm, and more preferably, the molding temperature may be set to 50° C. to 160° C. and the rotation speed of the extruder may be set to 200 to 300 rpm.

Thereafter, a masterbatch is obtained by ejecting a mixture of the black pigment and the masterbatch resin from the die of the kneader.

According to the masterbatch of the present embodiment, it is possible to obtain a uniform jet black color by satisfying the above-described specific conditions. In addition, conventionally, particularly in a case where the light source is sunlight, subtle changes in tint, texture, impression, and aesthetic sense tend to be felt. However, these changes can be reduced according to the masterbatch of the present embodiment. In addition, the above-described specific conditions as indices are adjusted by setting the temperature, time, kneading speed, and the like according to the primary average particle diameter of the black pigment, the specific surface area of the pigment, the blending amount of the pigment in a masterbatch thermoplastic resin, and the like, or combining the black pigment with other pigments. For this reason, it is possible to widen the range of selecting the pigment without being confined to a specific pigment.

In addition, the resin molded body produced using the masterbatch of the present embodiment intends a resin molded body having reduced unevenness in tint, texture, impression, aesthetic sense, and the like that can be visually felt by a user and from which a noble black color is felt even in a case where the reflection of light changes due to the difference in angles observed by a user, unevenness of a resin molded body, or the like. In addition, the uniform jet black color includes colors that reduce the reflection of light and invoke a calm impression by the black color.

Method for Evaluating Masterbatch

The method for evaluating a masterbatch containing a black pigment and a masterbatch thermoplastic resin evaluates the masterbatch according to whether or not the following conditions are satisfied.

(Conditions)

When a resin plate is produced by kneading 100 parts by weight of polypropylene having a melt flow rate of 30 g/10 min (JIS K7210:1999) and a density of 0.9 g/cm$^3$ (JIS K7112:1999) with respect to 3 parts by weight of the masterbatch and subjecting the mixture to injection molding using a mold polished by a coated abrasive with a particle size of #800 (JIS R6001:1998), a* value and b* value of a surface of the resin plate in the L*a*b* color system satisfy Expressions (1) to (4).

$$D=[(a^* \text{ value}_{20}-a^* \text{ value}_{45})^2+(b^* \text{ value}_{20}-b^* \text{ value}_{45})^2]^{1/2}+[(a^* \text{ value}_{45}-a^* \text{ value}_{75})^2+(b^* \text{ value}_{45}-b^* \text{ value}_{75})^2]^{1/2}+[(a^* \text{ value}_{75}-a^* \text{ value}_{110})^2+(b^* \text{ value}_{75}-b^* \text{ value}_{110})^2]^{1/2} \quad (1)$$

$$D<4.3 \quad (2)$$

$$\Delta a^*<2.5 \quad (3)$$

$$\Delta b^*<3.6 \quad (4)$$

(In the Expressions, a* value$_{20}$, a* value$_{45}$, a* value$_{75}$, a* value$_{110}$, b* value$_{20}$, b* value$_{45}$, b* value$_{75}$, and b* value$_{110}$ represent respective a* values and b* values when a perpendicular line is set to 45°, a light receiving unit is set to 90°, and light sources are set to 20°, 45°, 75°, and 110° using a multidirectional illuminating and unidirectional light receiving multi-angle colorimeter.

$\Delta a^*$=(maximum value among a* value$_{20}$, a* value$_{45}$, a* value$_{75}$, and a* value$_{110}$)−(minimum value among a* value$_{20}$, a* value$_{45}$, a* value$_{75}$, and a* value$_{110}$)

$\Delta b^*$=(maximum value among b* value$_{20}$, b* value$_{45}$, b* value$_{75}$, and b* value$_{110}$)−(minimum value among b* value$_{20}$, b* value$_{45}$, b* value$_{75}$, and b* value$_{110}$)).

It is possible to evaluate whether or not a uniform jet black color can be obtained according to whether or not the above-described specific conditions are satisfied. That is, since evaluation can be performed using a masterbatch, it is possible to determine in advance whether a uniform jet black color can be obtained without actually manufacturing a resin molding material and a molded body.

Resin Molding Material

The resin molding material contains the above-described masterbatch and a diluting resin.

In addition, the method for manufacturing a resin molding material includes a step of mixing the above-described masterbatch and a diluting resin together with additives as necessary. The mixing method is not particularly limited, and a well-known method can be used.

The diluting resin is a main raw material of the molded body, and is used as a resin for diluting the masterbatch. The diluting resin is not particularly limited, and examples thereof include a polyolefin resin such as polyethylene and polypropylene, a polystyrene resin, an acrylonitrile-butadiene-styrene (ABS) resin, a polycarbonate resin, a polyamide resin, a polyethylene terephthalate resin, a polybutylene terephthalate resin, and a polymethyl methacrylate resin (PMMA).

These may be used alone, or two or more kinds thereof may be mixed.

Molded Body

The molded body contains the above-described resin molding material.

In addition, the method for manufacturing the molded body includes subjecting the above-described resin molding material to injection molding together with additives as necessary. The injection molding is not particularly limited, and a well-known method can be used.

The molded body of the present embodiment achieves a uniform jet black color of a high level. The molded body of the present embodiment can be used in the fields such as electronic, electric, and OA devices, furniture, miscellaneous goods, automobile interior parts which are processed into various shapes and in which the outer appearance is regarded as important. Among them, applications requiring a uniform jet black color is suitable.

Although the embodiment of the present invention has been described above with reference to the drawings, this is an example of the present invention, and various configurations other than the above can be adopted.

For example, the masterbatch containing a black pigment and a masterbatch thermoplastic resin and satisfying the above-described conditions can be used, together with a diluting resin, for manufacturing a resin molding material.

EXAMPLES

The present invention will be described hereunder in more detail using Examples, but the content of the present invention is not limited thereto.

(Pigments)

Pigments used in Examples and Comparative Examples are as follows.

Black 7 (product name: BP 880, manufactured by Cabot), 16 nm primary average particle diameter, 220 $m^2/g$ specific surface area Green 7 (product name: Heliogen Green K8730, manufactured by BASF SE)

Green 50 (product name: 42-633A, manufactured by Tokan Material Technology Co., Ltd.)

Blue 15:1 (product name: Lionol Blue SL, manufactured by TOYOCOLOR CO., LTD.)

Blue 29 (product name: Ultramarine D-981, manufactured by DAIICHI KASEI CO., LTD.)

Red 122 (product name: Cinquasia Pink K4430 FP, manufactured by BASF SE)

Red101 (product name: Bayferrox 130M: manufactured by LANXESS)

Yellow 138 (product name: PA Yellow 890D, manufactured by BASF SE)

Brown 24 (product name: 42-134A, manufactured by Tokan Material Technology Co., Ltd.)

(Production of Masterbatch)

Examples 1 to 12 and Comparative Examples 1 to 12

All pigments and LLDPE (linear low density polyethylene) (ULT-ZEX 30501J, manufactured by Prime Polymer Co., Ltd.) were kneaded with a twin-screw extruder at a molding temperature of 50° C. to 160° C. and a rotation speed of the extruder of 200 rpm so that the total pigment concentration in a masterbatch became a concentration shown in Table 1, and the obtained kneaded material was ejected from the die to obtain a masterbatch.

The composition of all the pigments is as shown in Tables 2 to 7.

Comparative Examples 13 and 14

Masterbatches were obtained in the same manner as in Examples 7 and 12 except that the molding temperature was changed to 50° C. to 230° C.

(Preparation of Resin Plate)

First, 100 parts by weight of polypropylene (NOVATEC PP BC03B, a melt flow rate of 30 g/10 min (JIS K7210: 1999), a density of 0.9 $g/cm^3$ (JIS K7112:1999), manufactured by Japan Polypropylene Corporation) were kneaded in a continuous twin-screw extruder with respect to 3 parts by weight of the masterbatch, and a resin plate was prepared by subjecting the mixture to injection molding using a mold polished with a coated abrasive with a particle size of #800 (JIS R6001:1998).

The produced resin plate had a size of 80×50 mm and a thickness of 2 mm.

(Measurement)

Using a multidirectional illuminating and unidirectional light receiving multi-angle colorimeter ("CE-741GL" (manufactured by Macbeth)), each of a* values and b* values was measured when a perpendicular line was set to 45°, a light receiving unit was set to 90°, and light sources were set to 20°, 45°, 75°, and 110°.

In addition, the difference between the maximum value and the minimum value of the measured a* values was set to Δa*, and the difference between the maximum value and the minimum value of the measured b* values was set to Δb*.

The results are shown in Tables 2 to 7.

(Calculation of D)

D was calculated by applying the values to Expression (1). The results are shown in Tables 2 to 7.

$$D=[(a^* \text{ value}_{20}-a^* \text{ value}_{45})^2+(b^* \text{ value}_{20}-b^* \text{ value}_{45})^2]^{1/2}+[(a^* \text{ value}_{45}-a^* \text{ value}_{75})^2+(b^* \text{ value}_{45}-b^* \text{ value}_{75})^2]^{1/2}+[(a^* \text{ value}_{75}-a^* \text{ value}_{110})^2+(b^* \text{ value}_{75}-b^* \text{ value}_{110})^2]^{1/2} \quad (1)$$

(In the Expression, a* $\text{value}_{20}$, a* $\text{value}_{45}$, a* $\text{value}_{75}$, a* $\text{value}_{110}$, b* $\text{value}_{20}$, b* $\text{value}_{45}$, b* $\text{value}_{75}$, and b* $\text{value}_{110}$ represent respective a* values and b* values when a perpendicular line is set to 45°, a light receiving unit is set to 90°, and light sources are set to 20°, 45°, 75°, and 110° using a multidirectional illuminating and unidirectional light receiving multi-angle colorimeter.)

(Evaluation)

Evaluation was carried out as follows.

Under natural light (sunlight) outdoors between 10 am and 2 pm in fine weather, as shown in FIGS. 2(a) to 2(d), the resin plate P was positioned by setting a normal line n (perpendicular line) to 45° and an observer to 90° with respect to the resin plate P, so that the resin plate P was not in the shadow of the observer, and the appearance of the resin plate P was visually observed while changing the angle of the resin plate to 20°, 45°, 75°, and 110°. As a result of the observation, the uniform jet black color of the resin plate P was evaluated in a scale of 1 to 4. The lower the numerical value was, the more consistent the obtained jet black color was. The results are shown in Table 9.

TABLE 1

|  | Pigment concentration in resin plate | | | | | | Total pigment concentration in masterbatch | Total pigment concentration in total resin amount |
|---|---|---|---|---|---|---|---|---|
| Example 1 | Black 7 | 0.25 | Green 7 | 0.25 | | | 17% | 0.50% |
| Example 2 | Black 7 | 0.25 | Green 7 | 0.50 | | | 25% | 0.75% |
| Example 3 | Black 7 | 0.25 | Green 50 | 0.25 | | | 17% | 0.50% |
| Example 4 | Black 7 | 0.25 | Green 50 | 0.50 | | | 25% | 0.75% |
| Example 5 | Black 7 | 0.25 | Blue 29 | 0.25 | | | 17% | 0.50% |
| Example 6 | Black 7 | 0.25 | Blue 29 | 0.50 | | | 25% | 0.75% |
| Example 7 | Black 7 | 0.25 | Yellow 138 | 0.25 | | | 17% | 0.50% |
| Example 8 | Black 7 | 0.25 | Green 7 | 0.25 | Red 122 | 0.25 | 17% | 0.50% |
| Example 9 | Black 7 | 0.25 | Blue 29 | 0.25 | Yellow 138 | 0.25 | 17% | 0.50% |
| Example 10 | Black 7 | 0.25 | Blue 29 | 0.25 | Brown 24 | 0.25 | 17% | 0.50% |
| Example 11 | Black 7 | 0.25 | Blue 15:1 | 0.25 | Brown 24 | 0.25 | 17% | 0.50% |
| Example 12 | Black 7 | 0.25 | Blue 15:1 | 0.25 | Yellow 138 | 0.25 | 17% | 0.50% |
| Comparative Example 1 | Black 7 | 0.25 | Blue 15:1 | 0.25 | | | 17% | 0.50% |
| Comparative Example 2 | Black 7 | 0.25 | Blue 15:1 | 0.50 | | | 25% | 0.75% |
| Comparative Example 3 | Black 7 | 0.25 | Red 122 | 0.25 | | | 17% | 0.50% |
| Comparative Example 4 | Black 7 | 0.25 | Red 122 | 0.50 | | | 25% | 0.75% |
| Comparative Example 5 | Black 7 | 0.25 | Red 101 | 0.25 | | | 17% | 0.50% |
| Comparative Example 6 | Black 7 | 0.25 | Red 101 | 0.50 | | | 25% | 0.75% |
| Comparative Example 7 | Black 7 | 0.25 | Yellow 138 | 0.50 | | | 25% | 0.75% |
| Comparative Example 8 | Black 7 | 0.25 | Brown 24 | 0.25 | | | 17% | 0.50% |
| Comparative Example 9 | Black 7 | 0.25 | Brown 24 | 0.50 | | | 25% | 0.75% |
| Comparative Example 10 | Black 7 | 0.25 | Green 50 | 0.25 | Red 101 | 0.25 | 17% | 0.50% |
| Comparative Example 11 | Black 7 | 0.25 | Green 7 | 0.25 | Red 101 | 0.25 | 17% | 0.50% |
| Comparative Example 12 | Black 7 | 0.25 | Blue 29 | 0.25 | Red 122 | 0.25 | 17% | 0.50% |

TABLE 2

|  |  | Example 1 | | Example 2 | | Example 3 | | Example 4 | |
|---|---|---|---|---|---|---|---|---|---|
| (Δa*) | | 0.55 | | 0.59 | | 0.82 | | 1.65 | |
| (Δb*) | | 0.98 | | 1.04 | | 3.21 | | 3.07 | |
| D (Sum of distance) | | 1.54 | | 1.52 | | 3.59 | | 3.61 | |
| Resin plate (pigment | | Black 7 | 0.25% | Black 7 | 0.25% | Black 7 | 0.25% | Black 7 | 0.25% |
| concentration in resin plate) | | Green 7 | 0.25% | Green 7 | 0.5% | Green 50 | 0.25% | Green 50 | 0.5% |
| | Light source | a* | b* | a* | b* | a* | b* | a* | b* |
| Measurement result | 20° | −0.35 | −2.07 | −0.60 | −2.74 | −0.53 | −1.28 | −0.97 | −1.03 |
| | 45° | −0.10 | −1.24 | −0.91 | −3.32 | −1.03 | 0.91 | −2.11 | 1.17 |
| | 75° | 0.10 | −1.09 | −0.40 | −3.45 | −1.30 | 1.93 | −2.49 | 2.04 |
| | 110° | 0.20 | −1.50 | −0.32 | −3.78 | −1.35 | 1.65 | −2.62 | 1.91 |

TABLE 3

|  |  | Example 5 | | Example 6 | | Example 7 | | Example 8 | |
|---|---|---|---|---|---|---|---|---|---|
| (Δa*) | | 0.26 | | 0.11 | | 1.17 | | 1.62 | |
| (Δb*) | | 2.63 | | 1.86 | | 3.40 | | 2.07 | |
| D (Sum of distance) | | 3.00 | | 2.17 | | 3.89 | | 2.97 | |
| Resin plate (pigment | | Black 7 | 0.25% | Black 7 | 0.25% | Black 7 | 0.25% | Black 7 | 0.25% |
| concentration in resin plate) | | Blue 29 | 0.25% | Blue 29 | 0.5% | Yellow 138 | 0.25% | Green 7 | 0.25% |
| | | | | | | | | Red 122 | 0.25% |
| | Light source | a* | b* | a* | b* | a* | b* | a* | b* |
| Measurement result | 20° | −0.29 | −1.72 | −0.35 | −1.98 | −0.87 | −1.60 | 0.01 | −1.81 |
| | 45° | −0.33 | 0.22 | −0.44 | −0.72 | −2.00 | 0.92 | 1.12 | 0.19 |

TABLE 3-continued

|  |  | Example 5 |  | Example 6 |  | Example 7 |  | Example 8 |  |
|---|---|---|---|---|---|---|---|---|---|
|  | 75° | −0.25 | 0.91 | −0.36 | −0.12 | −2.04 | 1.80 | 1.54 | 0.26 |
|  | 110° | −0.07 | 0.59 | −0.33 | −0.42 | −1.99 | 1.56 | 1.63 | 0.02 |

TABLE 4

|  |  | Example 9 |  | Example 10 |  | Example 11 |  | Example 12 |  |
|---|---|---|---|---|---|---|---|---|---|
| ($\Delta a^*$) |  | 1.88 |  | 0.37 |  | 0.33 |  | 0.34 |  |
| ($\Delta b^*$) |  | 3.27 |  | 3.04 |  | 1.29 |  | 2.16 |  |
| D (Sum of distance) |  | 3.83 |  | 3.13 |  | 1.43 |  | 2.20 |  |
| Resin plate (pigment | | Black 7 | 0.25% | Black 7 | 0.25% | Black 7 | 0.25% | Black 7 | 0.25% |
| concentration in resin plate) | | Blue 29 | 0.25% | Blue 29 | 0.25% | Blue 15:1 | 0.25% | Blue 15:1 | 0.25% |
| | | Yellow 138 | 0.25% | Brown 24 | 0.25% | Brown 24 | 0.25% | Yellow 138 | 0.25% |
|  | Light source | a* | b* | a* | b* | a* | b* | a* | b* |
| Measurement result | 20° | −1.32 | −1.58 | −0.48 | −1.71 | −0.46 | −2.13 | −0.93 | −2.06 |
|  | 45° | −2.60 | 1.04 | −0.52 | 0.75 | −0.13 | −1.08 | −1.27 | −0.75 |
|  | 75° | −3.20 | 1.60 | −0.74 | 1.21 | −0.32 | −0.91 | −1.27 | −0.17 |
|  | 110° | −3.18 | 1.69 | −0.85 | 1.33 | −0.33 | −0.84 | −1.25 | 0.10 |

TABLE 5

|  |  | Comparative Example 1 |  | Comparative Example 2 |  | Comparative Example 3 |  | Comparative Example 4 |  |
|---|---|---|---|---|---|---|---|---|---|
| ($\Delta a^*$) |  | 2.50 |  | 3.36 |  | 2.29 |  | 4.22 |  |
| ($\Delta b^*$) |  | 1.44 |  | 0.61 |  | 4.67 |  | 4.78 |  |
| D (Sum of distance) |  | 3.00 |  | 3.57 |  | 5.95 |  | 6.95 |  |
| Resin plate (pigment | | Black 7 | 0.25% | Black 7 | 0.25% | Black 7 | 0.25% | Black 7 | 0.25% |
| concentration in resin plate) | | Blue 15:1 | 0.25% | Blue 15:1 | 0.5% | Red 122 | 0.25% | Red 122 | 0.5% |
|  | Light source | a* | b* | a* | b* | a* | b* | a* | b* |
| Measurement result | 20° | 0.31 | −2.36 | 0.95 | −3.52 | 0.58 | −0.88 | 1.57 | −0.61 |
|  | 45° | 1.91 | −1.33 | 3.07 | −4.13 | 2.22 | 2.93 | 4.75 | 3.44 |
|  | 75° | 2.81 | −0.92 | 4.19 | −3.87 | 2.87 | 3.79 | 5.79 | 4.47 |
|  | 110° | 2.76 | −1.02 | 4.31 | −4.05 | 2.84 | 3.07 | 5.77 | 3.64 |

TABLE 6

|  |  | Comparative Example 5 |  | Comparative Example 6 |  | Comparative Example 7 |  | Comparative Example 8 |  |
|---|---|---|---|---|---|---|---|---|---|
| ($\Delta a^*$) |  | 2.81 |  | 4.48 |  | 3.18 |  | 0.17 |  |
| ($\Delta b^*$) |  | 5.52 |  | 7.60 |  | 5.05 |  | 3.60 |  |
| D (Sum of distance) |  | 6.23 |  | 8.92 |  | 6.10 |  | 3.68 |  |
| Resin plate (pigment | | Black 7 | 0.25% | Black 7 | 0.25% | Black 7 | 0.25% | Black 7 | 0.25% |
| concentration in resin plate) | | Red 101 | 0.25% | Red 101 | 0.5% | Yellow 138 | 0.5% | Brown 24 | 0.25% |
|  | Light source | a* | b* | a* | b* | a* | b* | a* | b* |
| Measurement result | 20° | 0.75 | −0.38 | 2.18 | 0.85 | −2.39 | −0.35 | −0.35 | −0.86 |
|  | 45° | 2.35 | 3.30 | 5.06 | 6.43 | −5.03 | 3.54 | −0.51 | 2.07 |
|  | 75° | 3.45 | 5.08 | 6.45 | 8.42 | −5.38 | 4.70 | −0.52 | 2.74 |
|  | 110° | 3.56 | 5.14 | 6.66 | 8.45 | −5.57 | 4.70 | −0.47 | 2.69 |

TABLE 7

|  | Comparative Example 9 | Comparative Example 10 | Comparative Example 11 | Comparative Example 12 |
|---|---|---|---|---|
| ($\Delta a^*$) | 0.28 | 1.89 | 2.07 | 2.60 |
| ($\Delta b^*$) | 3.93 | 5.14 | 3.83 | 3.29 |

TABLE 7-continued

|  |  | Comparative Example 9 | | Comparative Example 10 | | Comparative Example 11 | | Comparative Example 12 | |
|---|---|---|---|---|---|---|---|---|---|
| D (Sum of distance) | | 4.09 | | 5.50 | | 4.38 | | 4.31 | |
| Resin plate (pigment concentration in resin plate) | | Black 7 Brown 24 | 0.25% 0.5% | Black 7 Green 50 Red 101 | 0.25% 0.25% 0.25% | Black 7 Green 7 Red 101 | 0.25% 0.25% 0.25% | Black 7 Blue 29 Red 122 | 0.25% 0.25% 0.25% |
|  | Light source | a* | b* | a* | b* | a* | b* | a* | b* |
| Measurement result | 20° | −0.48 | −0.32 | 0.40 | −0.50 | 0.17 | −1.37 | 0.55 | −1.32 |
|  | 45° | −0.70 | 2.93 | 1.62 | 3.36 | 1.50 | 1.42 | 2.60 | 1.65 |
|  | 75° | −0.75 | 3.61 | 2.17 | 4.52 | 2.12 | 2.37 | 3.14 | 1.97 |
|  | 110° | −0.76 | 3.46 | 2.29 | 4.64 | 2.24 | 2.46 | 3.15 | 1.90 |

TABLE 8

|  |  | Comparative Example 13 | | Comparative Example 14 | |
|---|---|---|---|---|---|
| (Δa*) | | 1.34 | | 0.48 | |
| (Δb*) | | 4.10 | | 3.65 | |
| D (Sum of distance) | | 4.35 | | 3.73 | |
| Resin plate (pigment concentration in resin plate) | | Black 7 Yellow 138 | 0.25% 0.25% | Black 7 Blue 15:1 Yellow 138 | 0.25% 0.25% 0.25% |
|  | Light source | a* | b* | a* | b* |
| Measurement result | 20° | −0.81 | −1.71 | −0.85 | −2.71 |
|  | 45° | −1.80 | 1.20 | −1.29 | −1.15 |
|  | 75° | −2.15 | 2.11 | −1.33 | −0.37 |
|  | 110° | −2.03 | 2.39 | −1.14 | 0.94 |

TABLE 9

|  | Evaluation result |
|---|---|
| Example 1 | 2 |
| Example 2 | 2 |
| Example 3 | 3 |
| Example 4 | 3 |
| Example 5 | 3 |
| Example 6 | 3 |
| Example 7 | 2 |
| Example 8 | 3 |
| Example 9 | 3 |
| Example 10 | 3 |
| Example 11 | 1 |
| Example 12 | 1 |
| Comparative Example 1 | 4 |
| Comparative Example 2 | 4 |
| Comparative Example 3 | 4 |
| Comparative Example 4 | 4 |
| Comparative Example 5 | 4 |
| Comparative Example 6 | 4 |
| Comparative Example 7 | 4 |
| Comparative Example 8 | 4 |
| Comparative Example 9 | 4 |
| Comparative Example 10 | 4 |
| Comparative Example 11 | 4 |
| Comparative Example 12 | 4 |
| Comparative Example 13 | 4 |
| Comparative Example 14 | 4 |

Priority is claimed on Japanese Patent Application No. 2016-013389, filed Jan. 27, 2016, the whole disclosure of which is incorporated herein by reference.

The invention claimed is:

1. A masterbatch comprising:

a black pigment;

one or more pigments other than the black pigment; and a masterbatch thermoplastic resin comprising at least one of polypropylene or linear low-density polyethylene, wherein a content of the black pigment is 10 to 90 mass % based on a total content of the black pigment and the one or more pigments other than the black pigment, wherein the total content of the black pigment and the one or more pigments other than the black pigment is greater than or equal to 15 parts by weight and less than or equal to 100 parts by weight with respect to 100 parts by weight of the masterbatch thermoplastic resin, wherein the black pigment comprises carbon black, wherein a content of the carbon black is greater than or equal to 95 mass % with respect to an entire content of the black pigment, wherein the masterbatch satisfies D<4.3, Δa*<2.5 and Δb*<3.6, wherein $D=[(a^* \text{ value}_{20}-a^* \text{ value}_{45})^2+(b^* \text{ value}_{20}-b^* \text{ value}_{45})^2]^{1/2}+[(a^* \text{ value}_{45}-a^* \text{ value}_{75})^2+(b^* \text{ value}_{45}-b^* \text{ value}_{75})^2]^{1/2}+[(a^* \text{ value}_{75}-a^* \text{ value}_{110})^2+(b^* \text{ value}_{75}-b^* \text{ value}_{110})^2]^{1/2}$ wherein a* value$_{20}$, a* value$_{45}$, a* value$_{75}$, a* value$_{110}$, b* value$_{20}$, b* value$_{45}$, b* value$_{75}$, and b* value$_{110}$ represent respective a* values and b* values in the L*a*b* color system in a case where a perpendicular line is set to 45°, a light receiving unit is set to 90°, and light sources are set to 20°, 45°, 75°, and 110° using a multidirectional illuminating and unidirectional light receiving multi-angle colorimeter, $\Delta a^* = $(maximum value among a* value$_{20}$, a* value$_{45}$, a* value$_{75}$, and a* value$_{110}$)−(minimum value among a* value$_{20}$, a* value$_{45}$, a* value$_{75}$, and a* value$_{110}$), and $\Delta b^* = $(maximum value among b* value$_{20}$, b* value$_{45}$, b* value$_{75}$, and b* value$_{110}$)−(minimum value among b* value$_{20}$, b* value$_{45}$, b* value$_{75}$, and b* value$_{110}$), wherein the a* values and the b* values are evaluated on a surface of a resin plate in the L*a*b* color system, the resin plate being produced by kneading 100 parts by weight of polypropylene having a melt flow rate of 30 g/10 min according to JIS K7210:1999 and a density of 0.9 g/cm$^3$ according to JIS K7112:1999 with respect to 3 parts by weight of the masterbatch and subjecting the mixture to injection molding using a mold polished by a coated abrasive with a particle size of #800 according to JIS R6001:1998.

2. The masterbatch according to claim 1, wherein an average primary particle size of the black pigment is 5 nm to 1 μm.

3. The masterbatch according to claim 1, wherein a specific surface area of the carbon black is 10 to 400 m$^2$/g.

4. The masterbatch according to claim 1, wherein the black pigment consists of only carbon black.

5. The masterbatch according to claim 1, wherein the other pigment comprises one or more kinds selected from a phthalocyanine pigment, an azo pigment, a polycyclic pigment, ultramarine blue, cobalt, red iron oxide, titanium oxide, nickel titanium yellow, and chromium titanium yellow.

6. A resin molding material comprising the masterbatch according to claim 1 and a diluting resin.

7. A molded body comprising the resin molding material according to claim 6.

8. A method for manufacturing a resin molding material, comprising mixing the masterbatch according to claim 1 with a diluting resin.

9. A method for manufacturing a molded body, comprising subjecting the resin molding material according to claim 6 to injection molding.

10. A method for evaluating a masterbatch containing a black pigment, one or more pigments other than the black pigment and a masterbatch thermoplastic resin comprising at least one of polypropylene or linear low-density polyethylene, wherein a content of the black pigment is 10 to 90 mass % based on a total content of the black pigment and the one or more pigments other than the black pigment, and the total content of the black pigment and the one or more pigments other than the black pigment is greater than or equal to 15 parts by weight and less than or equal to 100 parts by weight with respect to 100 parts by weight of the masterbatch thermoplastic resin, wherein the black pigment comprises carbon black, and wherein a content of the carbon black is greater than or equal to 95 mass % with respect to an entire content of the black pigment;

the method comprising:

measuring a* values and b* values of a surface of a resin plate in the L*a*b* color system, wherein the a* values and b* values are measured using a multidirectional illuminating and unidirectional light receiving multi-angle colorimeter, wherein a perpendicular line is set to 45°, a light receiving unit is set to 90°, and light sources are set to 20°, 45°, 75°, and 110, the resin plate is produced by kneading 100 parts by weight of polypropylene having a melt flow rate of 30 g/10 min according to JIS K7210:1999 and a density of 0.9 g/cm$^3$ according to JIS K7112:1999 with respect to 3 parts by weight of the masterbatch and subjecting the mixture to injection molding using a mold polished by a coated abrasive with a particle size of #800 according to JIS R6001:1998, to produce a resin molded body;

and evaluating whether or not a uniform jet black color of the resin molded body is obtained by determining whether or not the measured a* values and b* values of the surface of the resin plate in the L*a*b* color system satisfy the following conditions:

$D<4.3, \Delta a^*<2.5$ and $\Delta b^*<3.6$, wherein $D=[(a^* \text{ value}_{20}-a^* \text{ value}_{45})^2+(b^* \text{ value}_{20}-b^* \text{ value}_{45})^2]^{1/2}+[(a^* \text{ value}_{45}-a^* \text{ value}_{75})^2+(b^* \text{ value}_{45}-b^* \text{ value}_{75})^2]^{1/2}+[(a^* \text{ value}_{75}-a^* \text{ value}_{110})^2+(b^* \text{ value}_{75}-b^* \text{ value}_{110})^2]^{1/2}$ $\Delta a^*=$(maximum value among $a^* \text{ value}_{20}, a^* \text{ value}_{45}, a^* \text{ value}_{75},$ and $a^* \text{ value}_{110}$)−(minimum value among $a^* \text{ value}_{20}, a^* \text{ value}_{45}, a^* \text{ value}_{75},$ and $a^* \text{ value}_{110}$), and $\Delta b^*=$(maximum value among $b^* \text{ value}_{20}, b^* \text{ value}_{45}, b^* \text{ value}_{75},$ and $b^* \text{ value}_{110}$)−(minimum value among $b^* \text{ value}_{20}, b^* \text{ value}_{45}, b^* \text{ value}_{75},$ and $b^* \text{ value}_{110}$)).

wherein $a^* \text{ value}_{20}, a^* \text{ value}_{45}, a^* \text{ value}_{75}, a^* \text{ value}_{110}, b^* \text{ value}_{20}, b^* \text{ value}_{45}, b^* \text{ value}_{75},$ and $b^* \text{ value}_{110}$ represent respective a* values and b* values in the L*a*b* color system in a case where a perpendicular line is set to 45°, a light receiving unit is set to 90°, and light sources are set to 20°, 45°, 75°, and 110° using a multidirectional illuminating and unidirectional light receiving multi-angle colorimeter.

* * * * *